(12) United States Patent
Allinder et al.

(10) Patent No.: US 7,741,827 B2
(45) Date of Patent: Jun. 22, 2010

(54) PARAMETER CONTROL CIRCUIT INCLUDING CHARGING AND DISCHARGING CURRENT MIRRORS AND METHOD THEREFOR

(75) Inventors: Terry Allinder, Mesa, AZ (US); George H. Barbehenn, Gilbert, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 307 days.

(21) Appl. No.: 11/743,066

(22) Filed: May 1, 2007

(65) Prior Publication Data

US 2008/0272751 A1    Nov. 6, 2008

(51) Int. Cl.
*H02M 3/22* (2006.01)
*H03K 4/06* (2006.01)

(52) U.S. Cl. .................. 323/288; 363/127; 327/132
(58) Field of Classification Search ............. 323/288, 323/315, 317; 327/132; 363/127, 21.06, 363/21.14, 147
See application file for complete search history.

(56) References Cited

U.S. PATENT DOCUMENTS

| | | | |
|---|---|---|---|
| 4,983,931 A * | 1/1991 | Nakano ................. 331/111 |
| 5,303,138 A | 4/1994 | Rozman | |
| 5,389,872 A * | 2/1995 | Erhart et al. ................. 323/354 |
| 5,793,241 A * | 8/1998 | Sanzo et al. ................. 327/323 |
| 5,825,218 A * | 10/1998 | Colli et al. ................. 327/112 |
| 5,956,245 A | 9/1999 | Rozman | |
| 5,991,171 A | 11/1999 | Cheng | |
| 5,999,420 A | 12/1999 | Aonuma et al. | |
| 6,198,638 B1 | 3/2001 | Lee | |
| 6,265,856 B1* | 7/2001 | Cali' et al. ................. 323/273 |
| 6,373,727 B1 | 4/2002 | Hedenskog et al. | |
| 6,473,317 B1 | 10/2002 | Simopoulos | |
| 6,535,400 B2 | 3/2003 | Bridge | |
| 6,671,189 B2 | 12/2003 | Jansen et al. | |
| 6,813,166 B1 | 11/2004 | Chang et al. | |
| 6,819,154 B2* | 11/2004 | Greenfeld ................. 327/172 |
| 6,853,563 B1* | 2/2005 | Yang et al. ................. 363/21.15 |
| 6,995,991 B1 | 2/2006 | Yang et al. | |

* cited by examiner

*Primary Examiner*—Harry Behm
(74) *Attorney, Agent, or Firm*—Robert F. Hightower

(57) ABSTRACT

In one embodiment, a single input terminal of a parameter control circuit is utilized to form two different parameters of the parameter control circuit. In another embodiment, the parameter control circuit can include charging and discharging current mirrors.

14 Claims, 3 Drawing Sheets

PARAMETER CONTROL CIRCUIT INCLUDING CHARGING AND DISCHARGING CURRENT MIRRORS AND METHOD THEREFOR

BACKGROUND OF THE INVENTION

The present invention relates, in general, to electronics, and more particularly, to methods of forming semiconductor devices and structure.

In the past, the electronics industry utilized various methods and structures to form switching power supply controllers that regulated an output voltage to a desired value. In some cases, the power supply systems included a transformer and used a power switch to control current through a primary side of the transformer and a secondary switch in the secondary side of the transformer. Often, a signal from the secondary side of the transformer was used as a control signal to control the switching of the secondary switch. One example of such a power supply system is disclosed in U.S. Pat. No. 6,535,400 that issued to Christopher David Bridge on Mar. 18, 2003. One problem with such power supply systems was noise that was created on the synchronization signal due to the switching of currents through the secondary side of the transformer. These noise signals often resulted in inefficient operation of the power supply system.

Also, the number of package terminals used for an integrated circuit had an effect on the cost of the integrated circuit. The more terminals, the more complex the package, thus, the higher the cost. When integrating a secondary side power supply controller, it was important to minimize the number of pins utilized for the power supply control.

Accordingly, it is desirable to have a circuit that minimizes the effect of oscillations of the synchronization signal and that reduces the number of terminals required for the circuit.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
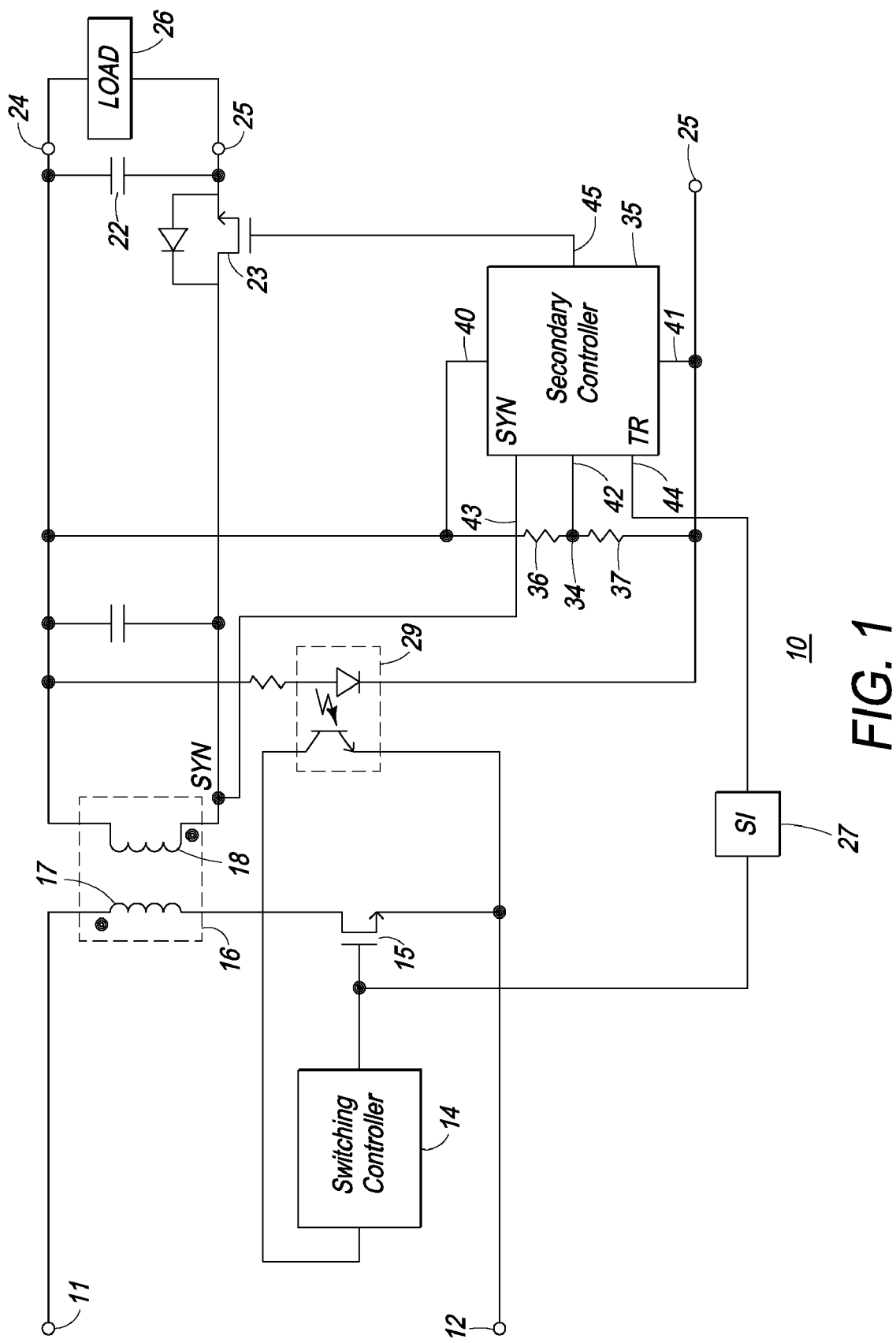
FIG. 1 schematically illustrates an embodiment of a portion of a power supply system that has a secondary side controller in accordance with the present invention.

FIG. 1 schematically illustrates an embodiment of a portion of a power supply system 10 that utilizes a secondary side power supply controller or secondary controller 35. Controller 35 is utilized to control the operation of a secondary side power switch, such as a transistor 23, that is connected in series with a secondary winding 18 of a transformer 16. System 10 generally receives an input voltage between a power input terminal 11 and a power return terminal 12 and regulates an output voltage to a desired value between an output 24 and an output return 25. System 10 generally includes transformer 16 that has a primary side winding 17 and secondary winding 18. A power switch, such as a transistor 15, is utilized to control current flow through primary winding 17 in order to regulate the value of the output voltage. A switching controller 14 is utilized to provide a switching drive signal in order to operate transistor 15. A feedback network 29, such as an optical coupler, forms a feedback signal that is representative of the value the output voltage. The feedback (FB) signal is used by controller 14 to assist in regulating the value of the output voltage. The secondary side of system 10 generally includes a filter capacitor 22, transistor 23, and controller 35.

Figure 2:
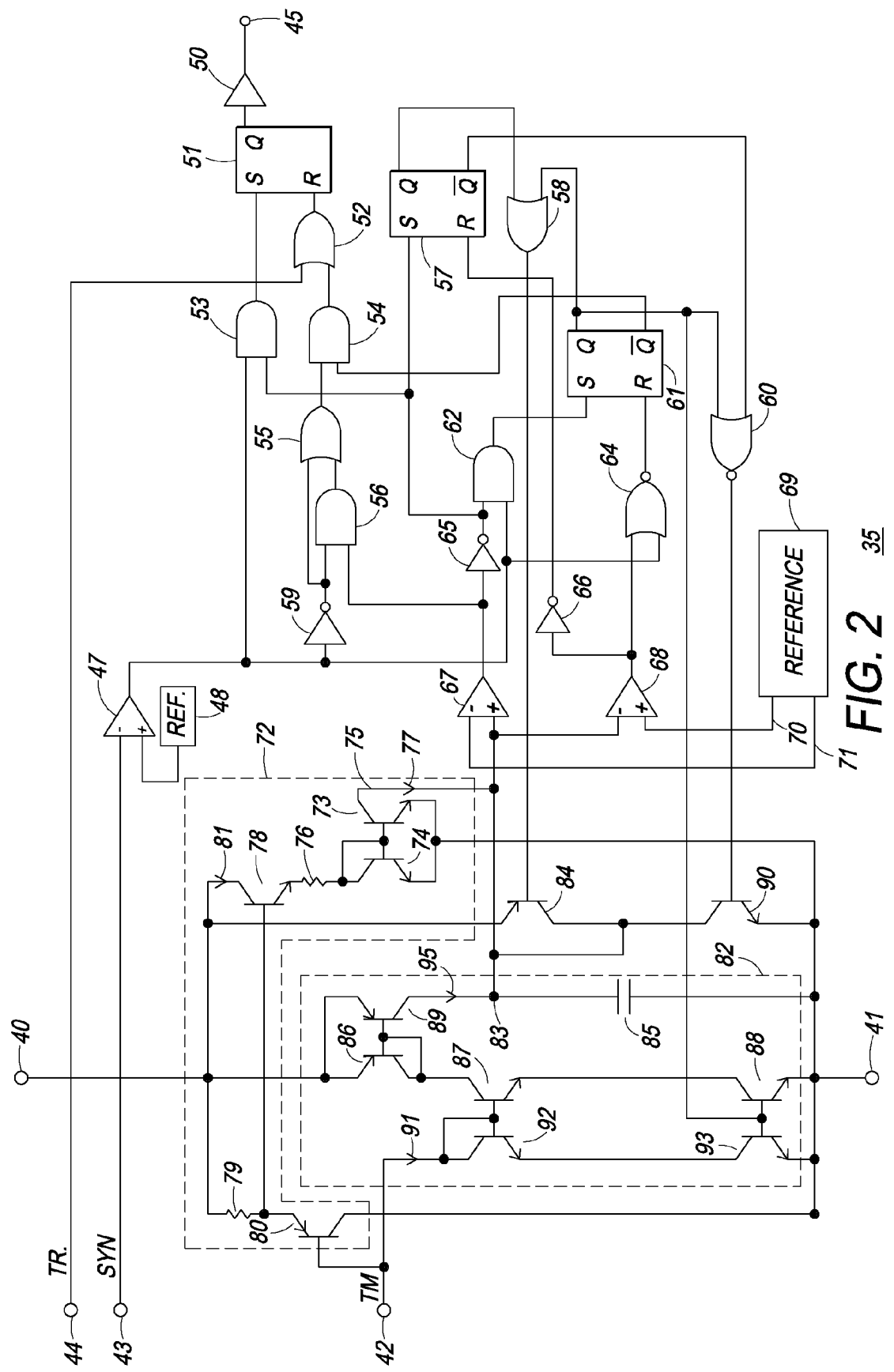
FIG. 2 schematically illustrates an embodiment of a portion of the controller of FIG. 1 in accordance with the present invention.

FIG. 2 schematically illustrates an embodiment of a portion of controller 35 that was explained in the description of FIG. 1. This description has references to both FIG. 1 and FIG. 2. Controller 35 includes a timing control section that has an off-time control circuit 72 and an on-time control circuit 82. As will be seen further hereinafter, circuits 82 and 72 are configured to ensure that transistor 23 is enabled for at least a minimum on-time and disabled for at least a minimum off-time, respectively. Controller 35 also includes a logic control section that includes a receiver 47, a reference generator circuit or ref 48, a buffer driver 50, a NOR gate 64, latches 51 and 61, OR gates 52, and 55, AND gates 53, 54, 56, and 62, inverters 59 and 65, comparators 67 and 68, and a reference generator circuit or reference 69. Reference 69 forms first and second reference signals 70 and 71 where the value of signal 70 is greater than the value of signal 71. As will be seen further hereinafter, the value reference signal 70 typically is close to the value of the voltage received on input 40 and the value of signal 71 is typically close to the value of the voltage on return 41. Receiver 47 receives a synchronization (SYN) signal from winding 18 (FIG. 1) on a SYN input 43 and responsively generates a logic signal for use by the logic control section of controller 35. A voltage input 40 and a voltage return 41 of controller 35 generally are connected to output 24 and return 25, respectively, in order to receive operating power for controller 35. A timing (TM) input 42 generally is connected to a timing node 34 (FIG. 1). A trigger (TR) input 44 is used to assist in controlling transistor 23. When system 10 is operating in the continuous conduction mode the current in winding 18 (under normal system loading conditions) never falls to zero prior to transistor 15 being enabled. To ensure that transistors 15 and 23 are never enabled at the same time, the switching drive signal from controller 14 is coupled through signal isolation (SI) device 27 into TR input 44. The signal coupled into input 44 leads the switching drive signal to transistor 15 so it can be used as a reset signal assist in preventing transistors 15 and 23 from being turned-on at the same time.

In operation, when controller 14 enables transistor 15 (FIG. 1), current flows through winding 17 which stores energy in the inductance of winding 17. While transistor 15 is enabled, transistor 23 is disabled and no current flows from a load 26 to winding 18. Current for load 26 is supplied by capacitor 22. When controller 14 disables transistor 15, current flow through winding 17 is terminated and energy is transferred from winding 17 to winding 18. When the energy transfer begins, transistor 23 is disabled and current flows through load 26 to winding 18 through the body diode of transistor 23. This causes the value of the SYN signal, and also the voltage on the input 43 of controller 35 and on the drain of transistor 23, to rapidly change from a high voltage to a negative voltage. The value of the negative voltage generally is clamped by the body diode of transistor 23 to approximately one volt (1 V) less than the voltage on return 25. During this transition, the parasitic inductances in the wiring to transistor 23 and the parasitic capacitance of transistor 23 can cause ringing or oscillations in the SYN signal. This ringing or oscillation would be received by controller 35 which can trigger the logic elements connected to input 43 and could cause unwanted oscillations in the drive signal to transistor 23 (FIG. 1). However, on-time control circuit 82 is configured to prevent the oscillations from affecting the control logic section for a time interval after the SYN signal goes low thereby providing a minimum on-time for transistor 23. Similarly, when transistor 23 turns-off and while operating in discontinuous conduction mode, when transistor 15 is enabled, the SYN signal goes high and oscillations can again occur. However, off-time control circuit 72 is configured to prevent the oscillations from affecting the control logic section for a different time interval after the SYN signal goes high thereby providing a minimum off-time for transistor 23. The functions of circuits 82 and 72 assist in preventing false disabling and re-enabling of transistor 23.

Assume for purpose of understanding the operation of controller 35 that transistor 15 is enabled, that current is flowing through winding 17, and that capacitor 85 is discharged to a value that is less than the value of signals 71 and 70 that are received by comparators 67 and 68, respectively. Since no current is flowing in winding 18, a high voltage is applied to input 43 which forces the output of comparator 47 low. Assuming that capacitor 85 was discharged from the previous cycle, the output of comparator 67 is low which forces the output of inverter high to set latch 57. The low Q bar output of latch 57 together with the low Q output of latch 61 forces the output of gate 60 high. The high from gate 60 enables transistor 90 to pull node 83 and ensuring that capacitor 85 is discharged. The high Q bar output of latch 57 forces the output pf gate 58 high to disable transistor 84. Thus, the output of comparator 67 is low, the output of inverter 65 is high, and the output of comparator 68 is high. The high from comparator 68 ensures that latch 61 is reset.

When transistor 15 is disabled, the energy transfer to winding 18 forms a low voltage on input 43 thereby forcing the output of comparator 47 high. Since inverter 65 was already high, the output of gate 62 is forced high to set latch 61. The high Q output forces the output of gate 60 low which disables transistor 90 thereby allowing capacitor 85 to be charged. Since the output of inverter 65 is high, the high from receiver 47 propagates through gate 53 and sets latch 51 which enables transistor 23 (FIG. 1). The high from receiver 47 also propagates through gate 62 and sets latch 61. The low from the Q bar output of latch 61 prevents changes in the SYN signal from propagating through gate 54 and prevents resetting latch 51. The high from the Q output of latch 61 enables transistors 88 and 93 to switch on the current mirror and cause a current 91 to flow through a transistor 92 and the current mirror that is formed by the configuration of transistors 87 and 92. Current 91 flowing through transistor 92 from input 42 is mirrored through transistor 87 by the size ratio between transistors 87 and 92. The current through transistor 87 is received by another current mirror that is formed by the configuration of transistors 86 and 89 thereby causing a current 95 to flow through transistor 89. The value of current 95 is proportional to current 91 by the size ratio between transistors 92 and 87 and transistors 86 and 89. Current 95 is used to charge capacitor 85. The value of signal 71 is very small and typically is very close to the value on return 41. In the preferred embodiment, the value of signal 71 is approximately 0.2 volts. As a result, the voltage on capacitor 85 quickly charges above the value of signal 71 which forces the output of comparator 67 high. The high from comparator 67 forces the output of inverter 65 low which prevents any changes in the SYN signal from propagating to the set input of latches 51 and 61. The low from inverter 59 prevents the high from comparator 67 from affecting the output of gate 56 and from resetting latch 51.

As can be seen, if SYN oscillates it must first go high since it is already low. If SYN were to go high the output of receiver 47 would go low which would not affect the set inputs of latches 51 and 61. The low from receiver 47 would force the output of inverter 59 high which would force the output of gate 55 high. Since the Q bar output of latch 61 is low, the high from gate 55 would not reset latch 51. Since the output of comparator 68 is high, the low from receiver 47 would not affect gate 64 and does not reset latch 61. Thus, capacitor 85 continues to charge until reaching the value of signal 70 which then forces the output of comparator 68 low. Consequently, circuit 82 ensures that transistor 23 remains enabled for a minimum on-time regardless of oscillations of the SYN signal. The low from comparator 68 forces the output of inverter 66 high to reset latch 57. The low from comparator 68 also forces the output of gate 64 high to reset latch 61.

When capacitor 85 has charged to the value of signal 70 and the output of comparator 68 goes low, if SYN is still low due to transistor 15 being disabled, the output of receiver 47 is still high and latch 61 is not affected by the low from comparator. If SYN is high when capacitor 85 is charged or when transistor 15 (FIG. 1) is enabled to force SYN high, the output of receiver 47 goes low. The low forces the output of inverter 59 and the output of gate 55 high, but the Q bar output of latch 61 is low which prevents resetting latch 51. The low from receiver 47 also propagates through gate 64 and resets latch 61.

Resetting latch 61 begins a discharge cycle of capacitor 85. The high Q bar output of latch 61 enables gate 54 to be controlled by gate 55 thereby resetting latch 51 and disabling transistor 23. Resetting latch 61 also forces the Q output of latch 61 low which disables transistors 88 and 93 thereby disabling the current mirror of transistors 87 and 92 and also causing transistors 87 and 92 to become a high impedance. Therefore, current 95 is no longer supplied to capacitor 85. Since current 95 no longer flows, off-time control circuit 72 supplies a current 77 that is used to discharge capacitor 85. The voltage at the emitter of transistor 78 is approximately equal to the voltage on input 42. This voltage on the emitter of transistor 78 causes a current 81 to flow through transistor 74. The current mirror configuration of transistors 73 and 74 causes a current 77 to flow through transistor 73. Current 77 is ratioed to current 81 by the size ratio between transistors 73 and 74. Current 77 quickly discharges capacitor 85 to a value less than the value of signal 70 which forces the output of comparator 68 high. The high from comparator 68 prevents any oscillation in the SYN signal from affecting the reset input of latch 61. As capacitor 85 discharges below the value of signal 71, the output of comparator 67 is forced low. The low from comparator 67 forces the output of inverter 65 high which sets latch 57. The low Q bar output of latch 57 and the low Q output of latch 61 force the output of gate 60 high to enable transistor 90 thereby ensuring that capacitor 85 remains discharged. Since input 42 switches between approximately the base-emitter voltage of transistor 92 and a voltage that is a thevenin equivalent of resistors 36 and 37, the switching could be affected by parasitic elements on input 42. Using latch 57 and transistors 84 and 90 to ensure that capacitor 85 remains discharged prevents any parasitic elements on input 42 from affecting the operation of controller 35.

Any oscillations of the SYN signal would first force SYN low since it is already high. If SYN were to go low the output of receiver 47 would go high, because the output of comparator 67 is high and the output of inverter 65 is low, the high from receiver 47 would not set latch 51 and also would not set latch 61. Consequently, transistor 23 remains disabled regardless of any oscillations of the SYN signal. Transistor 23 remains disabled until capacitor 85 discharges to the value of signal 71. Thus, circuit 72 set a minimum off-time interval for transistor 23.

During the time when capacitor 85 is discharging, but before the voltage on capacitor 85 is approximately equal to the value of signal 71, any oscillation on the SYN signal is ignored. When current 77 discharges capacitor 85 to approximately the value of signal 71, the output of comparator 67 goes low. The low from comparator 67 forces the output of 65 high. The next time current flows in winding 18, through the internal body diode of transistor 23, and the SYN input signals goes from high to low, the out of receiver 47 will go high, placing a high at the input to gate 53 thereby setting latch 51 and enabling transistor 23. As can be seen, circuit 82 is configured to form a first input current through input 43 responsively to the SYN signal and to use current 95 to form the on-time interval. Similarly, circuit 72 is configured to form a second input current through input 43 responsively to the SYN signal disabling current 95 and to use current 77 to form the off-time interval.

The time interval for charging capacitor 85 and the separate time interval for discharging capacitor 85 is set from the single input terminal 42 of controller 35. When the current mirror of transistors 87 and 92 are enabled, resistors 36 and 37 assist in forming a Thevenin equivalent circuit that sets the value of current 91, thus the value of current 95, and the time interval required to charge capacitor 85. When transistors 88 and 93 are enabled, transistors 92 and 93 clamp input 42 to a voltage value (Vcp) that is approximately the saturation voltage of transistor 93 plus the base-emitter (Vbe) of transistor 92. Typically, Vcp is about one volt (1 V). Since resistor 36 is connected to receive a fixed voltage of approximately the output voltage on output 24, resistors 36 and 37 form a voltage source having a Thevenin equivalent voltage given by:

$$Vth = ((Vo*R37)/(R36+R37))$$

where:
Vth—the Thevenin equivalent voltage form by resistors 36 and 37,
Vo—output voltage between output 24 and return 25,
R36—the value of resistor 36, and
R37—the value of resistor 37.

The Thevenin voltage source and the equivalent resistance of resistors 36 and 37 from a current into input 42 that is given by;

$$I91 = (Vth - Vcp)/Rth$$
$$= (Vth - Vcp)/((1/R36) + (1/R37))$$

substituting for Vth from the previous equation yields $$I91 = (((Vo*R37)/(R36+R37)) - Vcp)/((1/R36) + (1/R37))$$
$$= (Vo - Vcp)(R37/(R36+R37))$$

where:
I91—the value of current 91, and
Vcp—the clamp voltage formed by the saturation voltage of transistor 93 plus the Vbe of transistor 92.

When the current mirror of transistors 87 and 92 are disabled, resistors 36 and 37 assist in forming another Thevenin equivalent circuit that sets the value of current 77 and the time interval required to discharge capacitor 85. With transistors 88 and 93 disabled, circuit 72 clamps input 42 to a voltage that is approximately the collector to emitter voltage (Vce) of transistor 74. This voltage is generally about 0.5 volts. Since resistor 36 is connected to receive the fixed voltage of approximately the output voltage on output 24, resistors 36 and 37 form a voltage source having a thevenin equivalent voltage given by:

$$Vth = ((Vo*R37)/(R36+R37))$$

where:
Vth2—the Thevenin equivalent voltage for discharging capacitor 85,
Vo—output voltage between output 24 and return 25,
R36—the value of resistor 36, and
R37—the value of resistor 37.

The Thevenin voltage source of resistors 36 and 37 and the equivalent resistance of resistors 36 and 37 from a different current into input 42 that is given by;

$$I81 = \frac{Vo \frac{R37}{R37+R36} - Vce}{R76}$$

where:
I81—the value of current 81,
Vce—the collector emitter voltage of transistor 74; and
R76—the value of resistor 76.

Thus, the configuration of circuits 72 and 82 allow the single input 42 to be used to set two different time intervals for controller 35.

In one example embodiment, the value of the output voltage between output 24 and return 25 was nineteen volts (19 V), the saturation voltage of transistor 93 was approximately 0.4 volts and the Vbe of transistor 92 was approximately 0.5 volts so that the Vcp voltage on input 42 was approximately one volt (1 V). Additionally, the Vce of transistor 74 was approximately 0.5 volts, resistor 36 was approximately twenty thousand (20K) ohms, and resistor 37 was twenty hundred (200) ohms, and the current mirror ratios were all one-to-one. For this example embodiment, current 95 was approximately, forty milli-amperes (40 ma) and current 77 was approximately twelve and one-half milli-amperes (12.5 ma).

Those skilled in the art will appreciate that circuits 72 and 82 can be used to set two different voltage levels, as shown by the two different voltages formed on capacitor 85, or two different currents, as seen by currents 77 and 95, in addition to the two different time intervals formed by circuits 72 and 82. Additionally, it will be appreciated that the current mirror of transistors 73 and 74 may be switched in addition to the current mirror of transistors 87 and 92 being switched.

In order to facilitate this operation of controller 35, input 42 is commonly connected to a base of transistor 80, to a base and a collector of transistor 92, and to a base of transistor 87. An emitter of transistor 92 is connected to a collector of transistor 93. An emitter of transistor 93 is commonly connected to a collector of transistor 80, an emitter of transistor 88, and return 41. A base of transistor 88 is commonly connected to a base of transistor 93 and to the Q output of latch 61. A collector of transistor 88 is connected to an emitter of transistor 87. A collector of transistor 87 is commonly connected to a collector and base of transistor 86, and to a base of transistor 89. An emitter of transistor 86 is commonly connected to an emitter of transistor 89 and to input 40. A collector of transistor 89 is commonly connected to a first terminal of capacitor 85, a collector of transistor 73, a non-inverting input of comparator 67, and an inverting input of comparator 68. A second terminal of capacitor 85 is connected to return 41. An emitter of transistor 73 is commonly connected to an emitter of transistor 74 and to return 41. Base of transistor 73 is commonly connected to a base and a collector of transistor 74 and to a first terminal of resistor 76. A second terminal of resistor 76 is connected to an emitter of transistor 78. A collector of transistor 78 is connected to input 40 and to a first terminal of a resistor 79. A second terminal of resistor 79 is connected to an emitter of transistor 80 and to a base of transistor 78. An inverting input of comparator 67 is connected to receive signal 71 from reference 69. A non-inverting input of comparator 68 is connected to receive signal 70 from reference 69. The output of comparator 68 is connected to a first input of gate 64 which has an output connected to a reset input of latch 61. A second input of gate 64 is commonly connected to a first input of gate 62, an input of inverter 59, a first input of gate 53, and the output of receiver 47. A second input of gate 62 is commonly connected to the output of inverter 65, and a second input of gate 53. The input of inverter 65 is commonly connected to a first input of gate 56 and the output of comparator 67. The output of inverter 59 is commonly connected to a second input of gate 56 and a first input of gate 55. The output of gate 56 is connected to a second input of gate 55 which has an output connected to a first input of gate 54. A second input of gate 54 is connected to the Q bar output of latch 61. The output gate 54 is connected to a first input of gate 52 which has an output connected to the reset input of latch 51. A second input of gate 52 is connected to input 44. The output of gate 53 is connected to the set input of latch 51 which has a Q output connected to an input of driver 50. The output of driver 50 is connected to output 45. An inverting input of receiver 47 is connected to input 43 and a non-inverting input of receiver 47 is connected to the output of ref 48.

Figure 3:
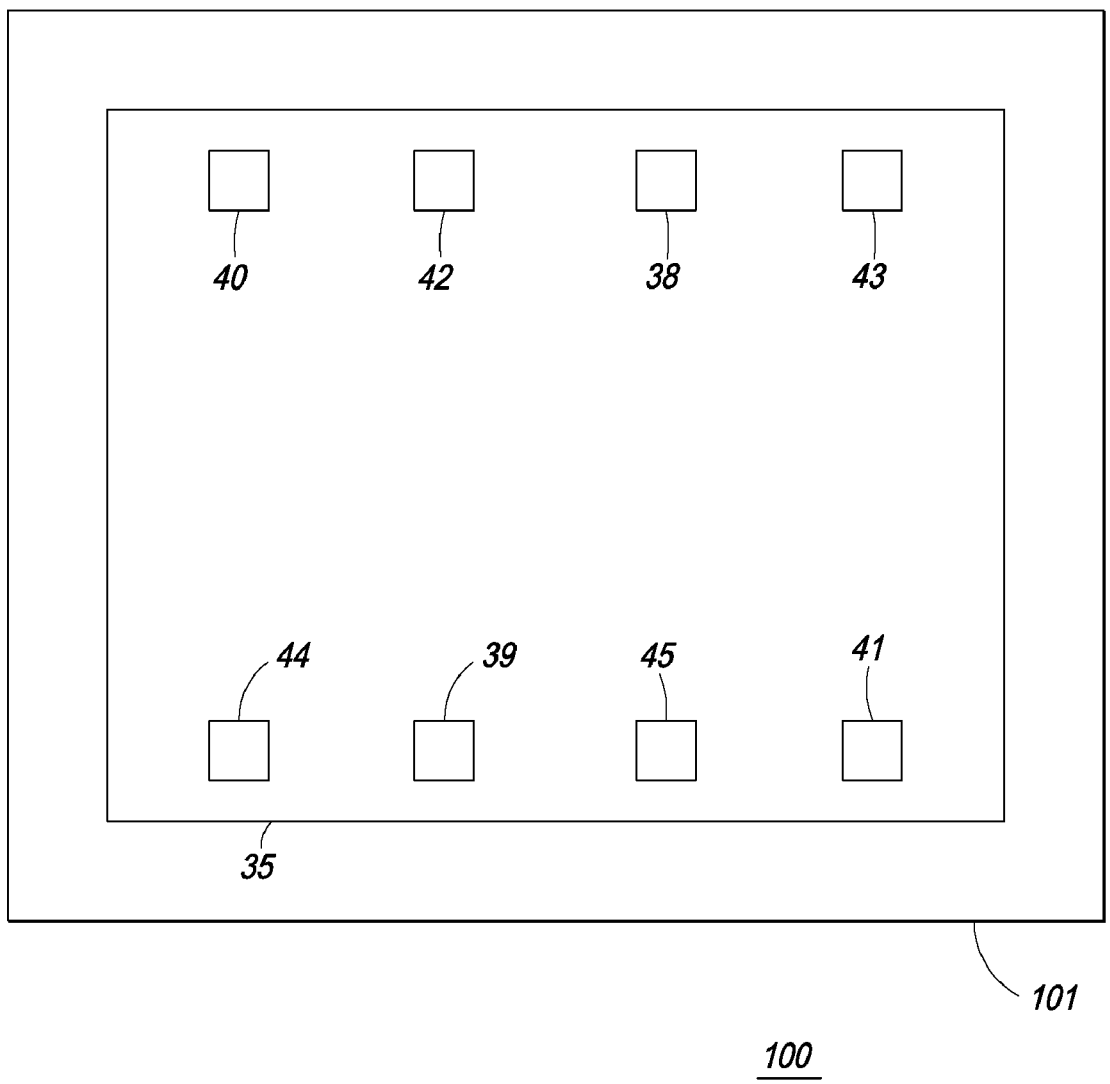
FIG. 3 schematically illustrates an enlarged plan view of a semiconductor device that includes the controller of FIG. 1 in accordance with the present invention.

FIG. 3 schematically illustrates an enlarged plan view of a portion of an embodiment of a semiconductor device or integrated circuit 100 that is formed on a semiconductor die 101. Controller 35 is formed on die 101. Die 101 may also include other circuits that are not shown in FIG. 3 for simplicity of the drawing. Controller 35 and device or integrated circuit 100 are formed on die 101 by semiconductor manufacturing techniques that are well known to those skilled in the art. In one embodiment, controller is formed on a semiconductor substrate as an integrated circuit having eight external leads 38-45.

In view of all of the above, it is evident that a novel device and method is disclosed. Included, among other features, is using a single input pin of an integrated circuit to form two different parameters including two different timing intervals (Such as the on-time and off-time interval), two different current values (such as currents 95 and 77), or two different voltage values (such as the two voltage levels that are formed on capacitor 85).

While the subject matter of the invention is described with specific preferred embodiments, it is evident that many alternatives and variations will be apparent to those skilled in the semiconductor arts. More specifically the subject matter of the invention has been described for a particular PNP and NPN transistor structure, although the method is directly applicable to other bipolar transistors, as well as to MOS, BiCMOS, metal semiconductor FETs (MESFETs), HFETs, and other transistor structures. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A parameter control circuit comprising:
   a first input;
   a first current mirror having an input path and a mirror path, the input path coupled to the first input;
   a switch configured to enable or disable a first current through the mirror path of the first current mirror, wherein the first current mirror clamps the first input to a first voltage value responsively to the switch enabling the first current;
   a capacitor coupled to receive the first current; and
   a second current mirror having an input path and a mirror path wherein the input path is coupled to the first input, the second current mirror coupled to form a second current through the mirror path to discharge the capacitor responsively to the switch disabling the first current wherein the second current mirror is configured to form the second current with a second value that is different from a first value of the first current.

2. The circuit of claim 1 wherein the input path of the first current mirror is coupled to the first input to receive a first input current that is representative of the first current and wherein the input path of the second current mirror is coupled to the first input to receive a second input current, the second current mirror operably coupled to form the second current representative of the second input current.

3. The circuit of claim 2 wherein the second current mirror receives the second input current responsively to the switch disabling the first current.

4. The circuit of claim 2 wherein the switch disables the first input current from flowing through the input path of the first current mirror.

5. The circuit of claim 1 further including a second input configured to receive a control signal used to enable and disable the switch.

6. The circuit of claim 1 wherein the first input is configured to receive a signal from a resistor divider.

7. A method of forming a parameter control circuit comprising:
   coupling a first circuit to a first input of the parameter control circuit;

configuring the first circuit to cause a first input current to flow through the first input and through a resistor divider and form a first current through the first circuit responsively to a control signal, wherein the first circuit clamps the first input to a first voltage value responsively to the first circuit causing the first input current to flow;

coupling the first circuit to use the first current to form one of a first time interval or a first voltage or a first current parameter;

coupling a second circuit to the first input;

configuring the second circuit to cause a second input current to flow through the first input and through the resistor divider and form a second current through the second circuit responsively to the control signal disabling the first current through the first circuit; and coupling the second circuit to use the second current to form one of a second time interval or a second voltage or a second current parameter.

8. The method of claim 7 wherein coupling the first circuit to use the first current to form one of the first time interval or the first voltage or the first current parameter includes coupling the first circuit to charge a capacitor with the first current.

9. The method of claim 8 wherein coupling the second circuit to use the second current to form one of the second time interval or the second voltage or the second current parameter includes coupling the second circuit to discharge the capacitor with the second current.

10. The method of claim 7 wherein coupling the first and second circuits to the first input includes configuring the first and second circuits to be coupled to a single resistor divider.

11. The method of claim 10 wherein configuring the first and second circuits to be coupled to the single resistor divider includes configuring the first circuit to receive a first state of the control signal and responsively configure the single resistor divider to provide a first input current to the first circuit, and configuring the second circuit to configure the single resistor divider to provide a second input current to the second circuit responsively to a second state of the control signal.

12. A method of forming a parameter control circuit comprising:

configuring a switch to enable a first current control circuit to form a first input current through a first input of the parameter control circuit and through a resistor divider by clamping the first input to a first voltage value responsively to a control signal enabling the switch;

configuring the parameter control circuit to use the first input current to form one of a first time interval or a first voltage or a first current parameter;

configuring a second current control circuit to form a second input current through the first input and through the resistor divider responsively to the control signal causing the first current control circuit to disable the first input current; and configuring the parameter control circuit to use the second input current to form one of a second time interval or a second voltage or a second current parameter.

13. The method of claim 12 wherein configuring the parameter control circuit to use the first input current includes coupling the parameter control circuit to charge a capacitor with the first input current.

14. The method of claim 13 wherein configuring the parameter control circuit to use the second input current includes coupling the parameter control circuit to discharge the capacitor with the second input current.

* * * * *